United States Patent [19]
Trine

[11] Patent Number: 6,065,189
[45] Date of Patent: *May 23, 2000

[54] CART HANDLE

[75] Inventor: Ralph D. Trine, Fremont, Ind.

[73] Assignee: Vestil Manufacturing Company, Angola, Ind.

[*] Notice: Under 35 U.S.C. 154(b), the term of this patent shall be extended for 197 days.

[21] Appl. No.: 08/598,795

[22] Filed: Feb. 9, 1996

[51] Int. Cl.[7] .................................................. A47B 95/02
[52] U.S. Cl. ............................................ 16/436; 16/110.1
[58] Field of Search .............................. 16/116 R, 111 R, 16/111 A, 115, DIG. 38; 280/642, 47.36, 47.371, 47.34; D34/27, 17, 21, 20; D8/315–320

[56] References Cited

U.S. PATENT DOCUMENTS

| | | | |
|---|---|---|---|
| D. 146,226 | 1/1947 | Mader | 16/111 A |
| D. 363,590 | 10/1995 | Kazmerchek et al. | D34/17 |
| 2,446,137 | 7/1948 | Krueger . | |
| 3,150,616 | 9/1964 | Berlin | D34/17 |
| 3,310,317 | 3/1967 | Luff | 280/47.34 |
| 3,534,432 | 10/1970 | Davies, III et al. | 16/111 A |
| 3,694,855 | 10/1972 | Meyer et al. . | |
| 3,697,095 | 10/1972 | Howell . | |
| 3,816,873 | 6/1974 | Thorud et al. . | |
| 4,790,559 | 12/1988 | Edmonds . | |
| 4,985,961 | 1/1991 | Keglen | 16/111 R |
| 5,168,601 | 12/1992 | Liu | 280/47.371 |
| 5,261,215 | 11/1993 | Hartz et al. . | |
| 5,299,816 | 4/1994 | Vom Braucke et al. | 280/47.34 |
| 5,299,826 | 4/1994 | Flowers . | |

FOREIGN PATENT DOCUMENTS

| | | | |
|---|---|---|---|
| 2631206 | 11/1989 | France . | |
| 2674810 | 10/1992 | France | 280/47.34 |

OTHER PUBLICATIONS

Allmed Inc., carts information/advertisement sheet.

*Primary Examiner*—Chuck Y. Mah
*Attorney, Agent, or Firm*—George Pappas

[57] ABSTRACT

A handle for transporting carts having wheels and used in transporting various articles, equipment, components, and other items. The cart handle includes an upper central generally horizontally disposed portion and hand grip sections extending generally downwardly therefrom at an obtuse angle from each end of the central portion. At the lower end of the hand grip sections attachment sections extend between and connect the hand grip sections to a back wall of the cart. The central horizontally disposed portion and hand grip sections are coplanar and are in a plane located at an acute angle with respect to a vertical plane. The hand grip sections extend downwardly at an obtuse angle with respect to the central horizontally disposed portion. The central portion, hand grip sections and attachment sections are made by bending tubing material and are integrally connected with one another.

12 Claims, 1 Drawing Sheet

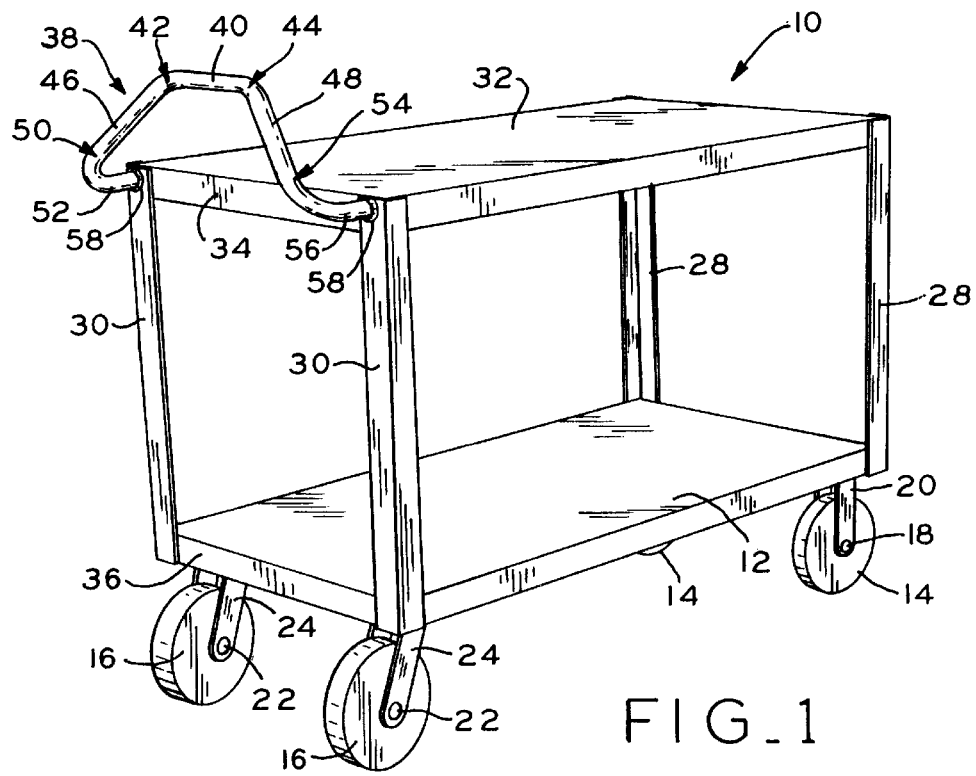
FIG_1
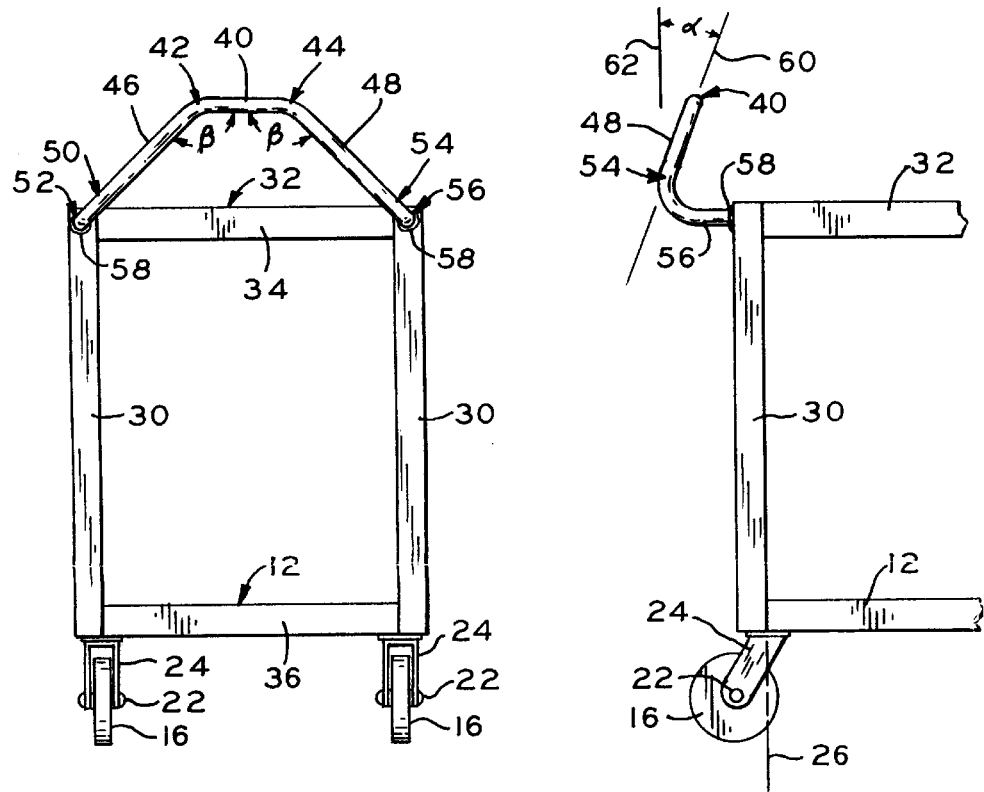
FIG_2  FIG_3

CART HANDLE

TECHNICAL FIELD

The present invention relates to the technical field of transporting carts typically used for carrying and transporting articles, components, equipment, etc. More specifically, the present invention relates to a handle for such transporting carts whereby the operator may easily and effectively move the cart without undo stress and fatigue.

BACKGROUND OF THE INVENTION

Transporting carts are presently commonly used in numerous different facilities such as factories, warehouses, hospitals, etc., for transporting parts, components, equipment and other items as needed throughout the facility. Such carts typically include three or four wheels, one or two of which are caster type, making the cart easy to turn and move as desired by the operator. In general, the operator loads the cart as needed at one location of the facility and, thereafter, pushes or pulls the cart as needed moving the cart to a desired location. For moving the cart, the operator typically grasps the cart or a handle of the cart and physically pushes or pulls the same for rolling and moving the cart in a direction as needed.

One prior known cart handle includes a generally horizontally disposed bar attached to the rear of the transporting cart at about waist high. The operator, thus, extends his arms and grasps the horizontally disposed handle bar for providing the necessary pushing and pulling forces to move the cart.

Another prior art handle includes a pair of generally vertically disposed bars also attached to the rear of a transporting cart. The vertically disposed bars are horizontally spread apart from one another. This provides vertically disposed left and right hand handles which are grasped by the operator for, again, pushing or pulling as needed for moving the cart.

Unfortunately, the prior art cart handles have substantial shortcomings and drawbacks. The forces exerted by the operator tend not to be easily and directly transmitted to the cart, thereby requiring excessive forces to push, pull and/or turn the cart. Furthermore, the operator must place his wrist in either a generally horizontal or vertical position for grasping the handles. These places undo stress on the operator's hands and arms thereby tiring the operator and creating undo fatigue. This is specially troublesome with larger heavier carts and when the operator must manipulate the cart for long periods of time. Accordingly, a need exists for a cart handle that more directly transmits the pushing and pulling forces from the operator's hands for manipulating the cart and which is less tiring to the operator even under heavier loads and longer periods of use.

SUMMARY OF THE INVENTION

It is the principal object of the present invention to overcome the above-discussed disadvantages associated with prior cart handles.

The present invention overcomes the disadvantages associated with prior cart handles by providing a handle including a central generally horizontally disposed portion with two ends. Hand grip sections are connected to each of the central portion ends and extend generally downwardly at an obtuse angle from the central horizontally disposed portion. The central portion and the hand grip sections are coplanar and are also in a plane which is at an acute angle with respect to a vertical plane.

At each other end of the hand grip sections, attachment sections are provided and are connected between the hand grip sections and the back wall of a cart. The attachment sections are generally horizontally disposed and extend perpendicularly from the cart back wall. Preferably, the hand grip sections are at an angle of about 120 to 150 degrees from the horizontally disposed central portion and the coplanar plane of the central portion and hand grip sections is at an angle of less than 35 degrees from a vertical plane. Additionally, the central portion, hand grip sections and attachment sections are integrally connected with one another and are formed of metal tubing by bending. In operation, the operator grasps the hand grip sections for pushing, pulling and turning the cart as needed. The location and angle of each hand grip section are such that the forces are more directly transmitted to the cart and fatigue is substantially decreased even for heavier loads and under longer periods of use.

In one form thereof, the present invention is directed to a handle for pushing or pulling a cart and includes a central generally horizontally disposed portion having two ends. Two hand grip sections are provided and are each connected to one of the central portion ends and extending at an obtuse angle from the central horizontally disposed portion. The central portion and the hand grip sections are coplanar and are in a plane at an acute angle with respect to a vertical plane.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a perspective view of a cart and a cart handle constructed in accordance with the principles of the present invention and attached to the cart back wall;

FIG. 2 is a back elevation view of the cart and handle shown in FIG. 1; and,

FIG. 3 is a side elevation view of the handle and partial side elevation view of the cart shown in FIG. 1.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DESCRIPTION OF THE PREFERRED EMBODIMENTS

Referring now to the drawings, there is shown an exemplary cart generally designated by the numeral 10. Cart 10 includes a generally rectangularly shaped lower platform 12 supported on front wheels 14 and back caster wheels 16. Front wheels 14 are adapted to turn about pivot pins 18 supported by fingers 20 which are affixed to the under side of lower platform 12. Back caster wheels 16 turn about pivot pins 22 which are supported by U-shaped members 24. U-shaped members 24 and wheels 16 are adapted to pivot about vertical axes 26 in a known and customary manner so that wheels 16 turn in the direction of motion, and so that cart 10 can be pushed or pulled and turned in a desired direction.

A pair of front legs 28 and a pair back legs 30 are affixed to the corners of lower platform 12 and extend vertically upwardly. At the upper ends of front legs 28 and back legs 30, there is provided an upper platform 32 which, like lower platform 12, is generally rectangularly shaped. Upper platform 32 is affixed at its corners to the upper ends of legs 30 and 32 and is supported thereat as shown. Upper platform 32, legs 28 and 30, lower platform 12, fingers 20 and U-shaped members 24 are preferably made of metal and are assembled and affixed together by welding or other suitable means. Accordingly, various components, items and other articles can be placed on lower platform 12 and upper platform 32, so as to be transported as may desired on cart 10.

At the back wall of cart 10 which is defined by back legs 30, back end 34 of upper platform 32 and back end 36 of lower platform 12, there is provided and affixed a cart handle shown and generally designated by the numeral 38. Cart handle 38 includes a central generally horizontally disposed portion 40 having a first end 42 and a second end 44. A first hand grip section 46 is connected to central horizontally disposed portion 40 at its first end 42 and extends generally downwardly. A second hand grip section 48 is also provided and is connected to central horizontally disposed portion 40 at its second end 44.

At the lower end 50 of first hand grip section 46 a first attachment section 52 is provided and is connected between first hand grip section 46 and the back wall or upper end of one back leg 30. Similarly, at the lower end 54 of second hand grip section 48 there is provided a second attachment section 56 which is connected between the back wall or upper end of a back leg 30 and the second hand grip section 48. As best seen in FIGS. 1 and 2, attachment sections 52 and 56 are preferably attached to the back wall of cart 10 at locations furthest to the left and right thereof. Furthermore, cart handle 38 is preferably made of steel cylindrical hollow tubing material, and is formed by bending thereby providing smooth transitional bends between central portion 40, hand grip sections 46 and 48, and attachment sections 52 and 56. Thus, in the preferred embodiment as shown, central portion 40, hand grip sections 46 and 48 and attachment sections 52 and 56 are integrally connected together. Preferably, attachment sections 52 and 56 are affixed to the back wall or legs 30 by welding as indicated by weld beads 58 or by other suitable means.

As best seen in FIG. 3, central portion 40 and hand grip sections 46 and 48 are coplanar and are in a plane designated by the numeral 60. Plane 60 is located at an angle alpha ($\alpha$) from a vertical plane 62. Alpha is an acute angle, and preferably is less than 35 degrees. Most preferably, angle alpha is approximately 20 degrees.

As now best shown in FIG. 2, hand grip sections 46 and 48 extend generally downwardly at an angle beta ($\beta$) from the generally horizontally disposed central portion 40. Preferably, angle beta is 120 to 150 degrees and, most preferably, angle beta is approximately 135 degrees. Additionally, attachment sections 52 and 56 are generally horizontally disposed and are perpendicular to both, the back wall of cart 12 and the central horizontally disposed portion 40.

In operation, a user or operator stands behind the cart back wall and grasps the hand grip sections 46 and 48. Depending on the height and chest width of the user and height of the cart handle 38, the user may grasp the hand grip sections 46 and 48 either up close to the central portion 40 or down close to attachment sections 52 and 56. As can be appreciated however, because hand grip sections 46 and 48 are located as shown and described, the user's wrists and arms are advantageously located at an economically comfortable location. Furthermore, because attachment sections 52 and 56 are connected to the back wall of cart 10 as close as possible to the left and right hand outer ends, the forces placed on the cart handle by the operator are effectively transmitted for more easily pushing, pulling and turning cart 10. It is further contemplated that foam or other force absorbent material (not shown) can be placed on hand grip sections 46 and 48 so as to better spread the forces from the user's hand to the hand grip sections.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A handle for pushing or pulling a cart, said handle comprising:

a central generally horizontally disposed portion having two ends;

two hand grip sections, each section connected to one of said central portion ends and extending at an obtuse angle from said central horizontally disposed portion;

wherein said central portion and said hand grip sections are coplanar and are in a plane at an acute angle with respect to a vertical plane;

wherein said central portion is located vertically above said hand grip sections and said hand grip sections extend generally downwardly;

further comprising a cart, and wherein one end of each of said hand grip sections are attached to said cart;

wherein said cart includes a back wall and said hand grip sections are attached to said back wall; and, further comprising two attachment sections, each attachment section connected between one of said hand grip sections and said cart back wall, and wherein said attachment sections are generally horizontally disposed.

2. The handle of claim 1 wherein said central portion, hand grip sections, and attachment sections are integrally connected with one another.

3. The handle of claim 2 wherein said central portion, hand grip sections, and attachment sections are formed of metal tubing.

4. The handle of claim 3 wherein said obtuse angles between said central portion and said hand grip sections are 120 to 150 degrees and wherein said acute angle between said coplanar plane and said vertical plane is less than 35 degrees.

5. A handle for pushing or pulling a cart, said handle comprising:

a central generally horizontally disposed portion having two ends;

two hand grip sections, each section connected to one of said central portion ends and extending at an obtuse angle from said central horizontally disposed portion;

wherein said central portion and said hand grip sections are coplanar and are in a plane at an acute angle with respect to a vertical plane;

wherein said central portion is located vertically above said hand grip sections and said hand grip sections extend generally downwardly;

wherein said central portion and said hand grip sections are formed of metal tubing and are integrally connected with one another; and, wherein said obtuse angles between said central portion and said hand grip sections are 120 to 150 degrees and wherein said acute angle between said coplanar plane and said vertical plane is less than 35 degrees.

6. A handle for pushing or pulling a cart, said handle comprising:

a central generally horizontally disposed portion having two ends;

two hand grip sections, each section connected to one of said central portion ends and extending at an obtuse angle from said central horizontally disposed portion;

wherein said central portion and said hand grip sections are coplanar and are in a plane at an acute angle with respect to a vertical plane;

wherein said central portion is located vertically above said hand grip sections and said hand grip sections extend generally downwardly; and, further comprising two attachment sections each being generally horizontally disposed and connected to one of said hand grip sections, whereby said handle is connected to a cart.

7. The handle of claim 6 wherein said central portion and hand grip sections are formed of metal tubing and are integrally connected with other another.

8. The handle of claim 7 wherein said obtuse angles between said central portion and said hand grip sections are 120 to 150 degrees and wherein said acute angle between said coplanar plane and said vertical plane is less than 35 degrees.

9. The handle of claim 6 wherein said obtuse angles between said central portion and said hand grip sections are 120 to 150 degrees and wherein said acute angle between said coplanar plane and said vertical plane is less than 35 degrees.

10. A handle for pushing or pulling a cart, said handle comprising:

a central generally horizontally disposed portion having two ends;

two hand grip sections, each section connected to one of said central portion ends and extending at an obtuse angle from said central horizontally disposed portion;

wherein said central portion and said hand grip sections are coplanar and are in a plane at an acute angle with respect to a vertical plane; and, further comprising two attachment sections each being generally horizontally disposed and connected to one of said hand grip sections, whereby said handle is connected to a cart.

11. A handle for pushing or pulling a cart, said handle comprising:

a central generally horizontally disposed portion having two ends;

two hand grip sections, each section connected to one of said central portion ends and extending at an obtuse angle from said central horizontally disposed portion;

wherein said central portion and said hand grip sections are coplanar and are in a plane at an acute angle with respect to a vertical plane; and, wherein said acute angle between said coplanar plane and said vertical plane is less than 35 degrees.

12. A handle for pushing or pulling a cart, said handle comprising:

a central generally horizontally disposed portion having two ends;

two hand grip sections, each section connected to one of said central portion ends and extending at an obtuse angle from said central horizontally disposed portion;

wherein said central portion and said hand grip sections are coplanar and are in a plane at an acute angle with respect to a vertical plane; and, wherein said obtuse angles between said central portion and said hand grip sections are 120 to 150 degrees and wherein said acute angle between said coplanar plane and said vertical plane is less than 35 degrees.

* * * * *

UNITED STATES PATENT AND TRADEMARK OFFICE
CERTIFICATE OF CORRECTION

PATENT NO. : 6,065,189
DATED : May 23, 2000
INVENTOR(S) : Ralph D. Trine It is certified that error appears in the above-identified patent and that said Letters Patent is hereby corrected as shown below:

Col. 4, line 3, change "economically" to --ergonomically--

Signed and Sealed this

Twentieth Day of March, 2001

*Attest:*

NICHOLAS P. GODICI

*Attesting Officer*  *Acting Director of the United States Patent and Trademark Office*